United States Patent
Zhu

(10) Patent No.: US 11,491,976 B2
(45) Date of Patent: Nov. 8, 2022

(54) COLLISION WARNING SYSTEM FOR SAFETY OPERATORS OF AUTONOMOUS VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 255 days.

(21) Appl. No.: 16/854,137

(22) Filed: Apr. 21, 2020

(65) Prior Publication Data
US 2021/0323541 A1    Oct. 21, 2021

(51) Int. Cl.
| | | |
|---|---|---|
| *B60W 30/09* | (2012.01) | |
| *B60W 50/14* | (2020.01) | |
| *B60W 30/095* | (2012.01) | |
| *B60W 60/00* | (2020.01) | |

(52) U.S. Cl.
CPC ........ *B60W 30/09* (2013.01); *B60W 30/0956* (2013.01); *B60W 50/14* (2013.01); *B60W 60/00272* (2020.02)

(58) Field of Classification Search
CPC .......... B60W 30/09; B60W 60/00272; B60W 30/0956; B60W 50/14; B60W 30/095; B60T 8/17558; G08G 1/16
USPC ........................................................ 701/301
See application file for complete search history.

(56) References Cited

U.S. PATENT DOCUMENTS

| | | | | |
|---|---|---|---|---|
| 9,676,328 B2 * | 6/2017 | Danz | ....................... | G08G 1/166 |
| 9,824,589 B1 * | 11/2017 | Ramirez | ................ | G08G 1/163 |
| 10,067,897 B1 * | 9/2018 | Lesher | .................. | G01S 7/4972 |
| 2012/0068859 A1 * | 3/2012 | Mochizuki | .......... | B60R 21/0134 |
| | | | | 340/903 |

(Continued)

FOREIGN PATENT DOCUMENTS

| | | | | |
|---|---|---|---|---|
| CN | 110834627 A * | 2/2020 | ............. | B60Q 1/143 |
| DE | 102009020649 A1 * | 11/2010 | .......... | B60T 8/17558 |
| DE | 102019005491 A1 * | 3/2020 | | |

OTHER PUBLICATIONS

Jaiprakash Narain Dwivedi, "Estimation of the Collision Risk of Autonomous Vehicle using Clustering," 2019, vol. 1, Publisher: IEEE.*

(Continued)

*Primary Examiner* — Tuan C To
(74) *Attorney, Agent, or Firm* — Womble Bond Dickinson (US) LLP

(57) ABSTRACT

Embodiments disclose a system and method to send an alert/warning for a potential collision to a safety operator of an autonomous driving vehicle (ADV). According to one embodiment, a system perceives an environment of an autonomous driving vehicle (ADV), including one or more obstacles. The system determines whether the ADV will potentially collide with the one or more obstacles based on a planned trajectory. If the ADV is determined to potentially collide, the system determines a time to collision based on the planned trajectory and the one or more obstacles. If the determined time to collision is less than a threshold or the time to collision decreases for a predetermined number of consecutive planning cycles, the system generates a warning signal to alert an operator of the ADV. The system sends the warning signal to an operator interface of the ADV to alert the operator of the potential collision.

21 Claims, 9 Drawing Sheets

(56) References Cited

U.S. PATENT DOCUMENTS

| | | | | |
|---|---|---|---|---|
| 2012/0265418 | A1* | 10/2012 | Foerster | B60W 10/06 |
| | | | | 701/70 |
| 2013/0282268 | A1* | 10/2013 | Goerick | G08G 1/166 |
| | | | | 701/301 |
| 2013/0325306 | A1* | 12/2013 | Caveney | B60W 30/0953 |
| | | | | 701/117 |
| 2015/0025784 | A1* | 1/2015 | Kastner | B60W 30/0956 |
| | | | | 701/119 |
| 2015/0177007 | A1* | 6/2015 | Su | G01C 21/3647 |
| | | | | 701/25 |
| 2017/0344855 | A1* | 11/2017 | Mande | G06K 9/6267 |
| 2018/0162388 | A1* | 6/2018 | You | G06V 20/58 |
| 2018/0345958 | A1* | 12/2018 | Lo | G08G 1/166 |
| 2019/0315346 | A1* | 10/2019 | Yoo | B60W 50/12 |
| 2020/0180657 | A1* | 6/2020 | Iwamoto | G05D 1/0088 |
| 2020/0225343 | A1* | 7/2020 | Lee | B60W 40/072 |
| 2021/0046923 | A1* | 2/2021 | Olson | G05D 1/0088 |
| 2021/0129834 | A1* | 5/2021 | Gier | G05D 1/0214 |
| 2021/0133466 | A1* | 5/2021 | Gier | G05D 1/0223 |
| 2021/0291768 | A1* | 9/2021 | Balasubramanian | |
| | | | | B60R 21/0134 |
| 2021/0291825 | A1* | 9/2021 | Goriesky | B60W 30/085 |
| 2021/0300358 | A1* | 9/2021 | Sherrit | B60W 50/16 |

OTHER PUBLICATIONS

Lei et al., "Vehicle Collision Avoidance Algorithm Based on State Estimation in the Roundabout," 2012, Publisher: IEEE.*

* cited by examiner

COLLISION WARNING SYSTEM FOR SAFETY OPERATORS OF AUTONOMOUS VEHICLES

TECHNICAL FIELD

Embodiments of the present disclosure relate generally to operating autonomous driving vehicles. More particularly, embodiments of the disclosure relate to a collision warning system for safety operators of autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A safety operator for an autonomous driving vehicle can prevent traffic accidents and fatalities. A safety operator can take over automated driving systems when there is a clear danger of a collision. However, it is hard for a safety operator to be focused at all times. Thus a safety mechanism to remind the safety operators when they should pay extra attention is very important.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments disclose a system and method to send an alert/warning for a potential collision to a safety operator of an autonomous driving vehicle (ADV). According to one embodiment, a system perceives an environment of an autonomous driving vehicle (ADV), including one or more obstacles. The system determines whether the ADV will potentially collide with the one or more obstacles based on a planned trajectory. If the ADV is determined to potentially collide, the system determines a time to collision based on the planned trajectory and the one or more obstacles. If the determined time to collision is less than a threshold or the time to collision decreases for a predetermined number of consecutive planning cycles, the system generates a warning signal to alert an operator of the ADV. The system sends the warning signal to a user interface of the ADV to alert the operator of the potential collision.

Figure 1:
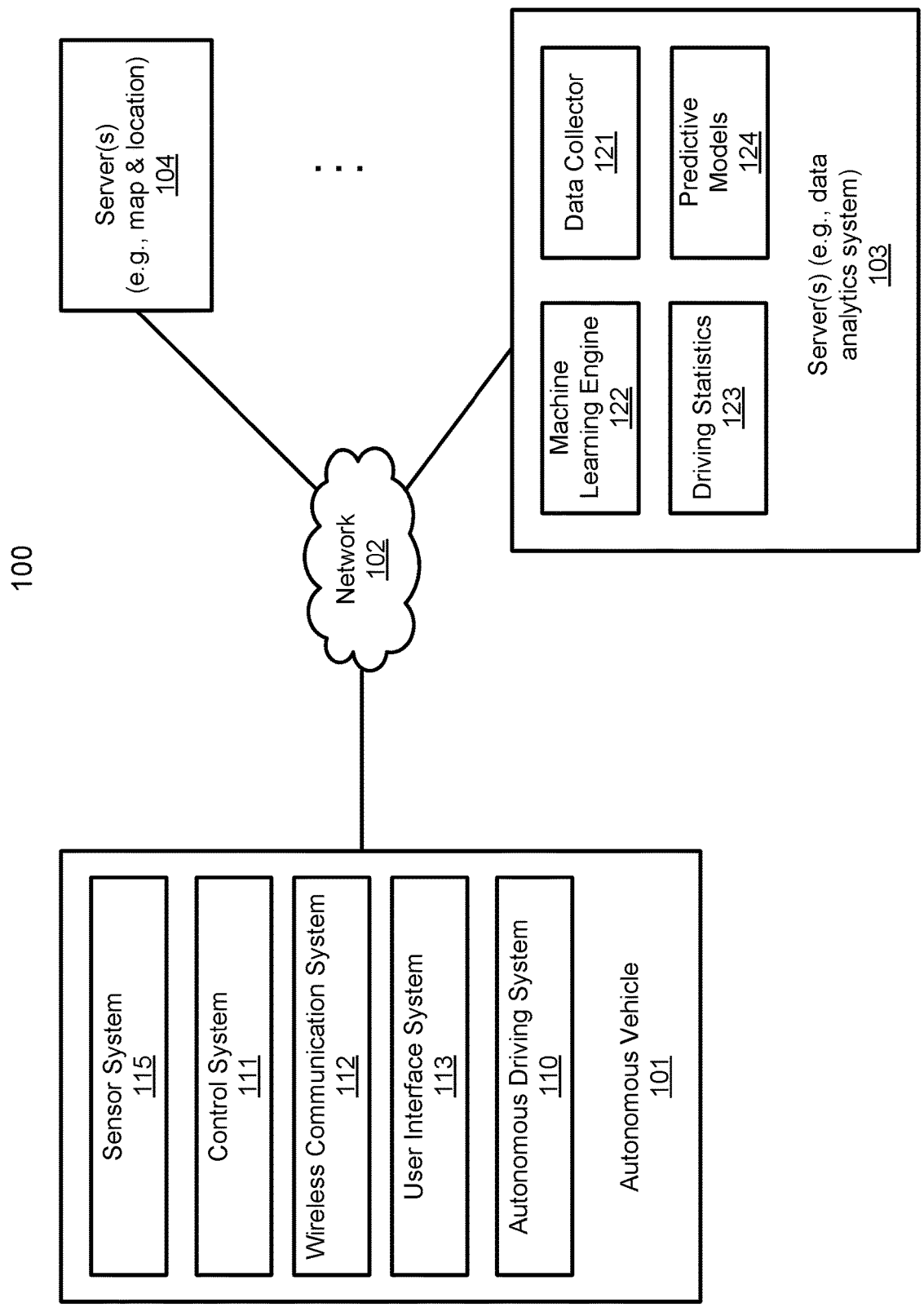
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
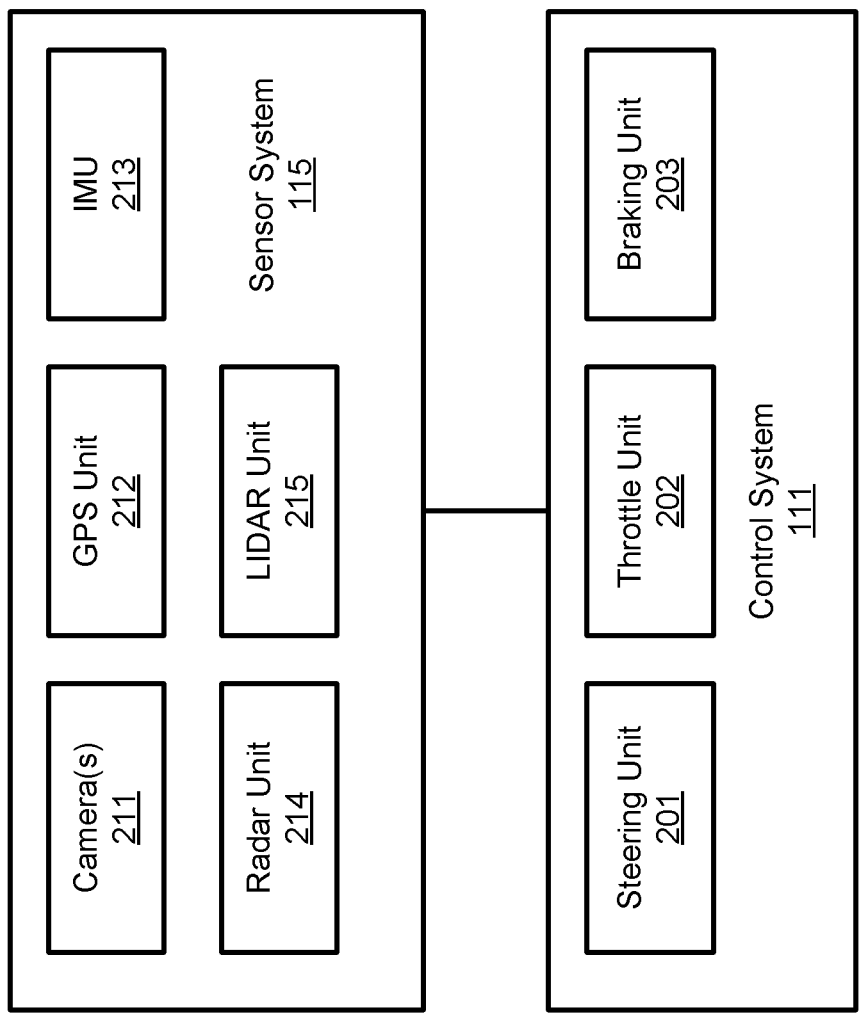
FIG. 2 is a block diagram illustrating an example of an autonomous driving vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, weather conditions, and road conditions, such as slow traffic on freeway, stopped traffic, car accident, road construction, temporary detour, unknown obstacles, etc.

Based on driving statistics 123, machine learning engine 122 generates or trains a set of rules, algorithms, and/or predictive models 124 for a variety of purposes, including algorithms to generate a collision warning/alert for the ADV. Algorithms/models 124 can then be uploaded onto ADVs to be utilized by the ADVs during autonomous driving in real-time.

Figure 3A:
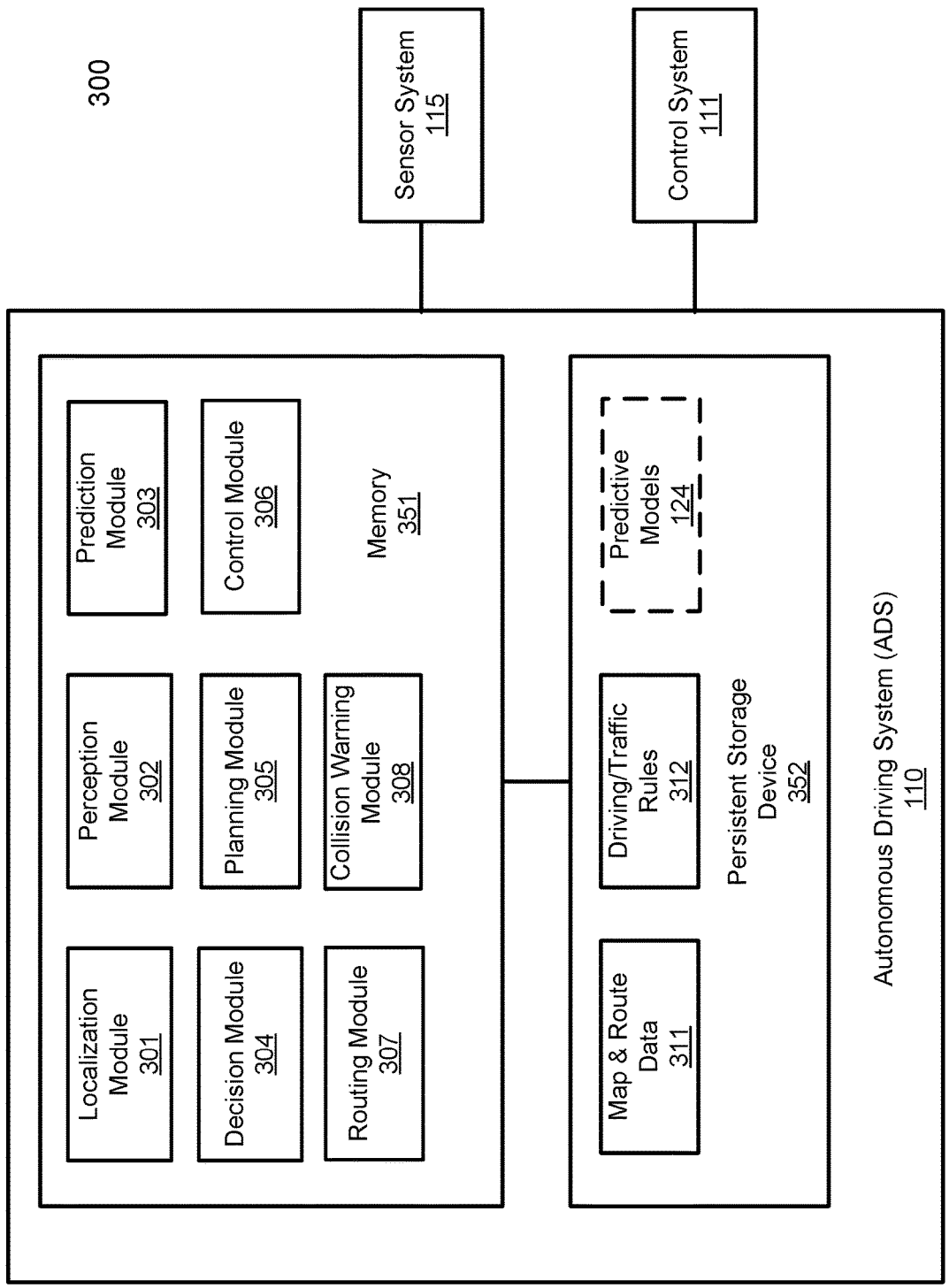
FIGS. 3A-3B are block diagrams illustrating an example of an autonomous driving system used with an autonomous driving vehicle according to one embodiment.
Figure 3B:
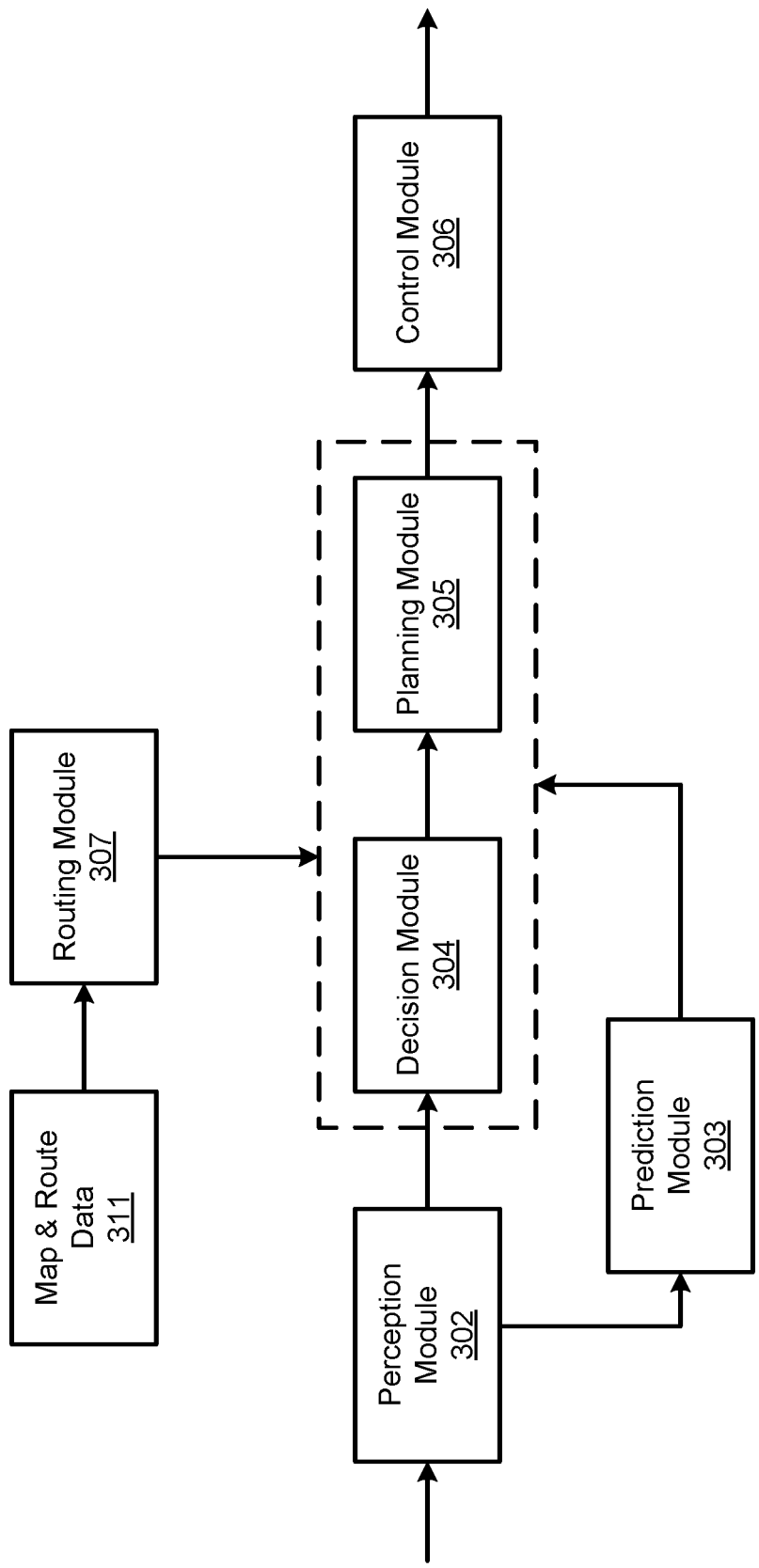

FIGS. 3A and 3B are block diagrams illustrating an example of an ADS used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and smooth steering module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to effect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Decision module 304/planning module 305 may further include a collision avoidance system or functionalities of a collision avoidance system to identify, evaluate, and avoid or otherwise negotiate potential obstacles in the environment of the ADV. For example, the collision avoidance system may effect changes in the navigation of the ADV by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the ADV that would be swerved into. The collision avoidance system may automatically select the maneuver that is both available and maximizes safety of occupants of the ADV. The collision avoidance system may select an avoidance maneuver predicted to cause the least amount of acceleration in a passenger cabin of the ADV.

Figure 4:
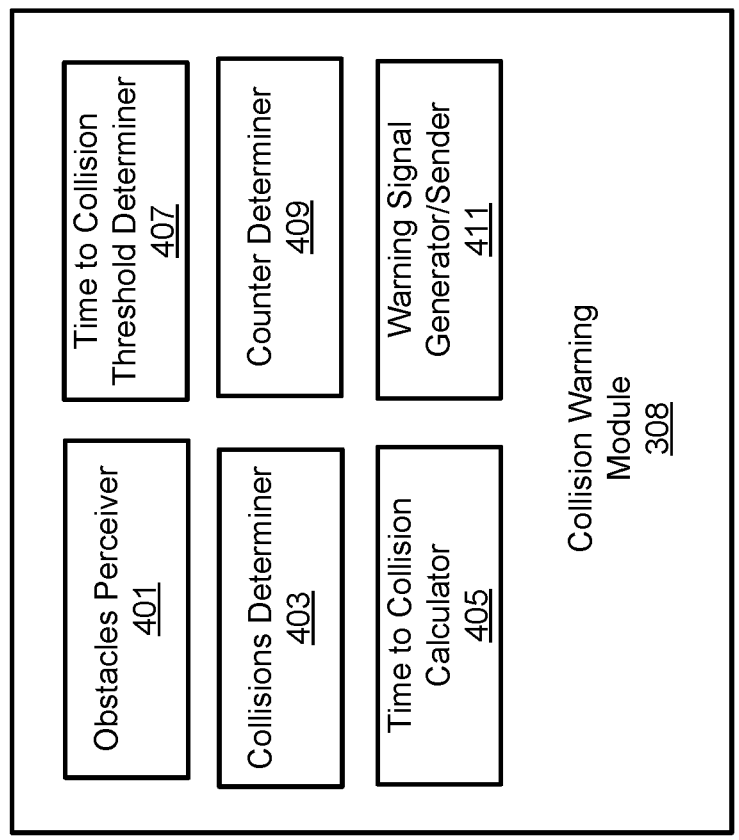
FIG. 4 is a block diagram illustrating a collision warning module according to one embodiment.

FIG. 4 is a block diagram illustrating an example of a collision warning module according to one embodiment. Collision warning module 308 can generate a collision warning/alert for an ADV to alert a safety operator of a potential collision. Referring to FIG. 4, collision warning module 308 can include submodules such as obstacles perceiver 401, collision determiner 403, time-to-collision calculator 405, time-to-collision threshold determiner 407, counter determiner 409, and warning signal generator/ sender 411. Obstacles perceiver 401 can perceive an environment of the ADV including one or more obstacles within view of the ADV. Collision determiner 403 can determine, based on a planned trajectory of the ADV, whether the ADV is within a collision course with any of the one or more obstacles. Time-to-collision calculator 405 can calculate a collision distance from the ADV to any of the one or more obstacles. The collision distance can be converted into a time-to-collision (TTC) (a time-based value) based on a current speed and a heading direction of the ADV and/or a predicted speed and heading direction of any of the one or more obstacles that is predicted to collide with the ADV. A TTC value is a time that remains until a collision between the vehicle and an obstacle would have occurred if a collision path and speeds of the vehicles/obstacles are maintained. Time-to-collision threshold determiner 407 can determine a threshold for a time-to-collision to generate a warning alert. In one embodiment, a time-to-collision threshold is approximately two seconds. Counter determiner 409 can determine a count threshold where the time-to-collision decreases consecutively before a warning signal is generated. In one embodiment, the preset counter is approximately 5. Warning signal generator/sender 411 can generate and/or send a warning alert to a user interface of the ADV to alert a safety operator operating the ADV. Note that although collision warning module 308 is illustrated as a standalone module, collision warning module 308 and planning module 305 may be an integrated module.

Figure 5:
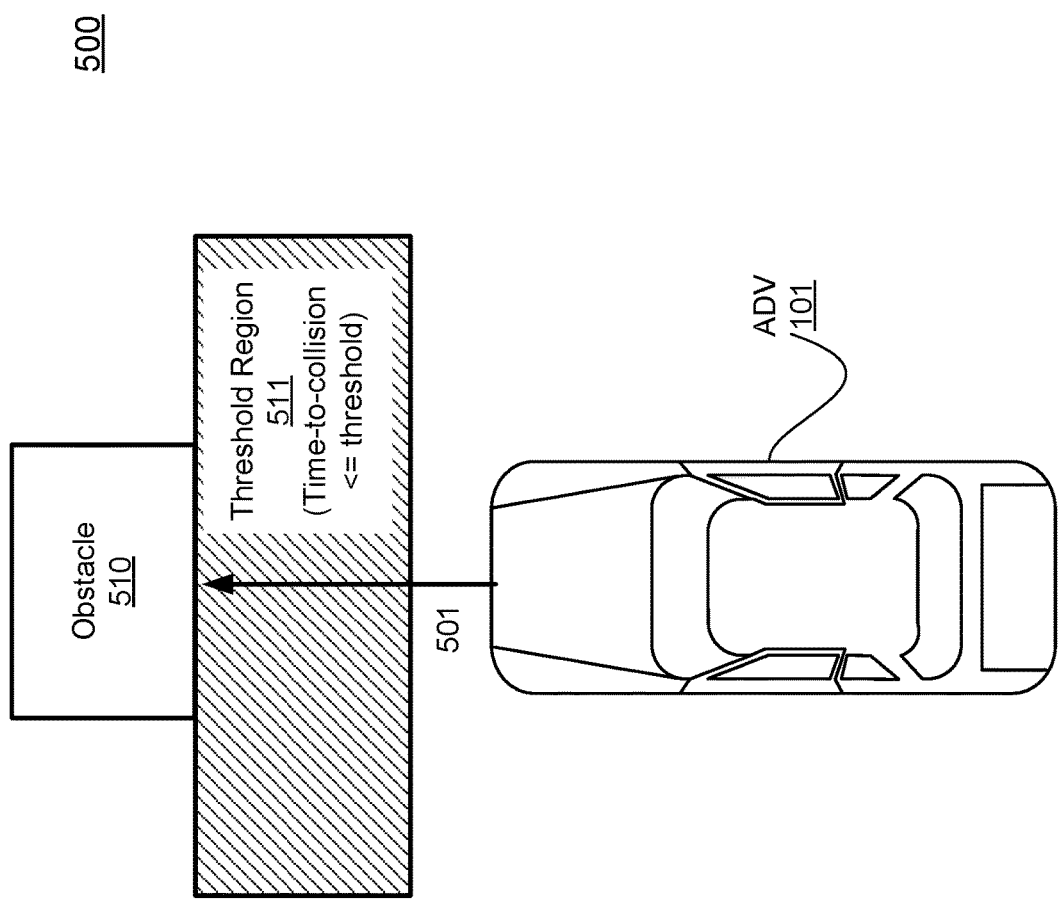
FIG. 5 illustrates an example of an ADV in a potential collision according to one embodiment.

FIG. 5 illustrates an example of an ADV in a potential collision according to one embodiment. Referring to FIG. 5, in scenario 500, ADV 101 has a current planned trajectory 501. Trajectory 501 includes a velocity profile and a heading direction for ADV 101 at any point along a path of trajectory 501. ADV 101 can perceive, using sensors, a distance to obstacle 510 in a collision path of ADV 101. In one embodiment, based on a distance to obstacle 510 and a current velocity of the ADV, ADV 101 determines a time to collision. The time to collision is compared with a predetermined threshold (e.g., approximately 2 seconds) to determine whether to trigger a warning alert. For example, ADV 101 may be 30 meters away from obstacle 510 operating at 10 m/s. Thus, the TTC for ADV 101 may be calculated to be 30/(10 m/s)=3 seconds. For a 2 seconds threshold, the TTC of 3 seconds for ADV 101 is not met and the warning condition is not triggered. Thus, ADV 101 would not signal a warning alert.

In another embodiment, ADV 101 may calculate a TTC threshold region 511, that is, a region where ADV 101 will be within the TTC threshold. Here, the threshold can be determined to be 2 seconds*10 m/s=20 meters. Thus, if ADV 101 enters threshold region 511, i.e., is within 20 meters to obstacle 510 while operating at 10 m/s, ADV 101 will trigger a warning alert to alert a safety operator of a potential collision. In another embodiment, ADV 101 will automatically apply a hard brake (approximately 3 m/s^2) when ADV 101 enters the threshold region 511.

Figure 6:
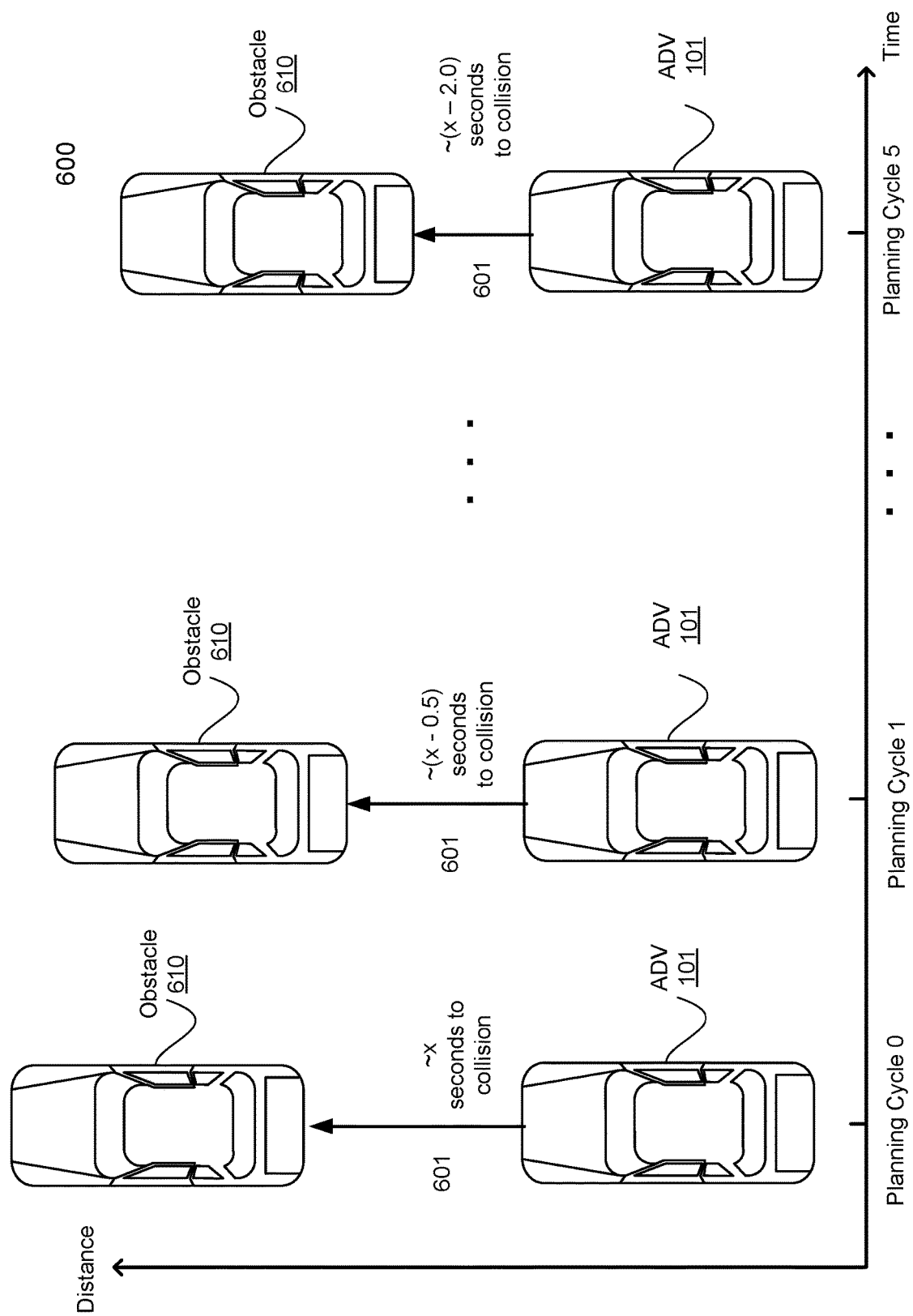
FIG. 6 illustrates a time graph of an ADV in another potential collision according to one embodiment.

FIG. 6 illustrates a time graph of an ADV in another potential collision according to one embodiment. Scenario 600 shows a time span of five planning cycles (0-4) for ADV 101. In this scenario, ADV 101 has a current planned trajectory 601 following vehicle 610 (or obstacle 610). Based on a sensor of ADV 101, ADV 101 can determine, at planning cycle 0, ADV 101 is within ~x seconds TTC to obstacle 610. Over the next planning cycles, ADV can determine the subsequent TTC to obstacle 610. In one embodiment, if ADV 101 determines TTC consecutively decreases for a predetermined number of planning cycles (count threshold), e.g., each of the planning cycles has a TTC less than the previous immediate planning cycle, ADV 101 triggers a warning alert to the safety operator of ADV 101. For example, if TTC=(x, x−0.5, x−1.0, x−1.5, x−2.0) over 5 planning cycles and the predetermined number of planning cycles threshold is 5, a warning/alert signal is to be triggered.

Note that, in this case, each of the five consecutive planning cycles having a TTC less than its immediate previous planning cycle would triggered the warning signal. In another embodiment, ADV 101 will automatically apply a mild brake (approximately 1 m/s^2) to decelerate ADV 101 when ADV 101 determines the count threshold (e.g., 5) of consecutive decreasing TTC has been reached.

In another embodiment, a counter is used to count up the number of consecutive decreasing TTC planning cycles and a warning is trigger if the counter reaches the predetermined number of planning cycle, e.g., a count threshold of 5. In some embodiments, a count threshold and a TTC threshold can be combined such that either one of the trigger conditions (as shown in FIGS. 5-6) can be applied to trigger the warning alert. In this case, the warning alert can be triggered if ADV 101 is within a TTC threshold as shown in FIG. 5 or if ADV 101 has a decreasing TTC for a count threshold of planning cycles. Although a count threshold of 5 and a TTC threshold of 2 seconds are used, any value can be used.

Figure 7:
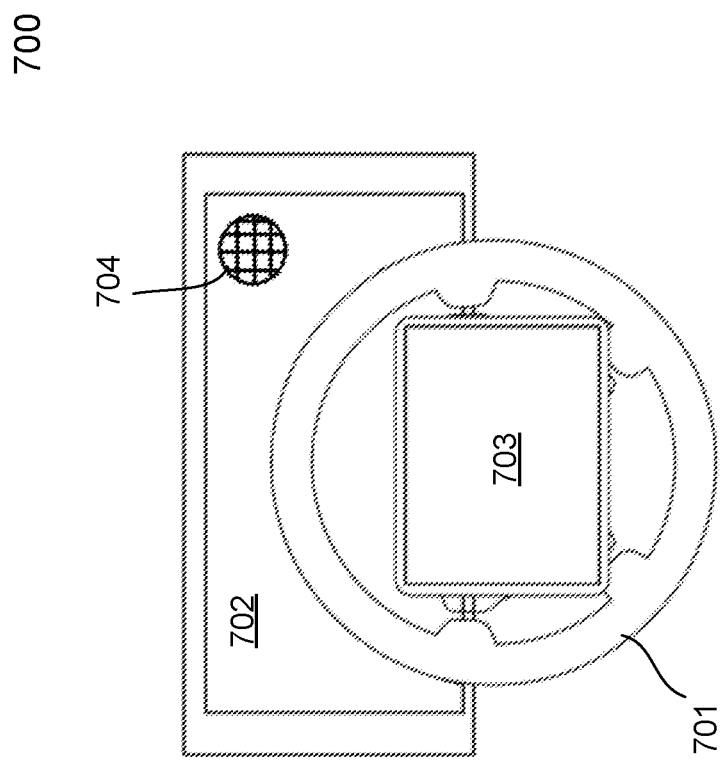
FIG. 7 is a block diagram illustrating an operator interface of an ADV according to one embodiment.

FIG. 7 is a block diagram illustrating an operator interface of an ADV according to one embodiment. Referring to FIG. 7, operator interface 700 of ADV 101 includes a driving wheel 701, one or more display devices 702-703, and speaker device 704. Here, operator interface 700 is a view of a safety operator of ADV 101. In one embodiment, if ADV 101 triggered a warning signal (the warning signal can be generated by collision warning module 308 as part of the ADS 110 of FIG. 3A), collision warning module 308 may send the warning signal through a controlled area network (CAN) bus of ADV 101 to operator interface 700 of ADV 101. In another embodiment, the warning signal may be display to an output device coupled to ADS 110 of FIG. 3A. In one embodiment, the warning signal may be displayed as a warning symbol, a warning color indicator, or a warning statement on any of display devices 702-703, and/or may trigger an audible alert through speaker device 704. Although an operator interface is illustrated, the warning signal may warn a safety operator through other interfaces within a view of the safety operator of ADV 101, such as a touch feedback, e.g., feedback vibration through driving wheel 701, etc.

Figure 8:
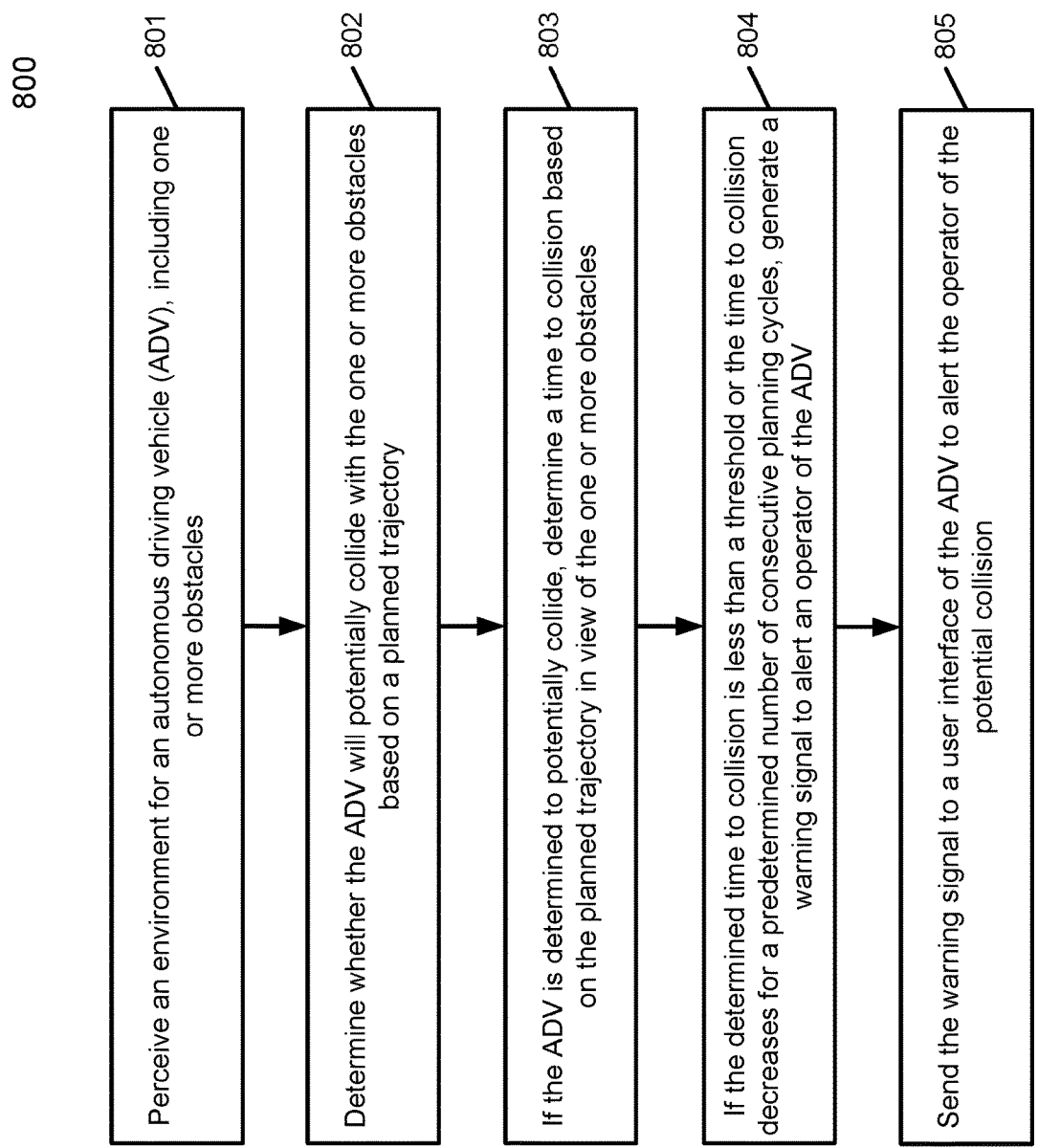
FIG. 8 is a flow diagram illustrating a method performed by an ADV according to one embodiment.

FIG. 8 is a flow diagram illustrating a method performed by an ADV according to one embodiment. Processing 800 may be performed by processing logic which may include software, hardware, or a combination thereof. For example, process 800 may be performed by collision warning module 308 of FIG. 4. Referring to FIG. 8, at block 801, processing logic perceives an environment for an autonomous driving vehicle (ADV), including one or more obstacles. At block 802, processing logic determines whether the ADV will potentially collide with the one or more obstacles based on a planned trajectory. At block 803, if the ADV is determined to potentially collide, processing logic determines a time to collision based on the planned trajectory and the one or more obstacles. At block 804, if the determined time to collision is less than a threshold or the time to collision decreases for a predetermined number of consecutive planning cycles, processing logic generates a warning signal to alert an operator of the ADV. At block 805, processing logic sends the warning signal to a user interface of the ADV to alert the operator of the potential collision.

In one embodiment, the warning signal is sent through a controlled area network (CAN) bus to a user interface of the ADV to warn the operator. In one embodiment, the threshold is approximately 2 seconds and the predetermined number of consecutive planning cycles is approximately 5.

In one embodiment, processing logic further displays the warning signal on a display device of the ADV or sounding an alarm through a speaker of the ADV. In one embodiment, if the time to collision is determined to be less than the threshold, the ADV performs a hard brake.

In another embodiment, if the time to collision is determined to be more than the threshold but the time to collision decreases for the predetermined number of consecutive planning cycles, the ADV performs a mild brake. In another embodiment, the mild brake is approximately one m/s^2 and the hard brake is approximately three m/s^2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   perceiving an environment for an autonomous driving vehicle (ADV), including one or more obstacles;
   determining whether the ADV will potentially collide with the one or more obstacles based on a planned trajectory;
   if the ADV is determined to potentially collide, determining a time to collision based on the planned trajectory and the one or more obstacles;
   if the determined time to collision is less than a threshold or the time to collision decreases for a predetermined number of consecutive planning cycles, generating a warning signal to alert an operator of the ADV; and
   sending the warning signal to a user interface of the ADV to alert the operator of the potential collision.

2. The computer-implemented method of claim 1, wherein the warning signal is sent through a controlled area network (CAN) bus to a user interface of the ADV to warn the operator.

3. The computer-implemented method of claim 1, wherein the threshold is approximately 2 seconds and the predetermined number of consecutive planning cycles is approximately 5.

4. The computer-implemented method of claim 1, further comprising displaying the warning signal on a display device of the ADV or sounding an alarm through a speaker device of the ADV.

5. The computer-implemented method of claim 1, wherein if the time to collision is determined to be less than the threshold, the ADV performs a hard brake.

6. The computer-implemented method of claim 5, wherein if the time to collision is determined to be more than the threshold but the time to collision decreases for the predetermined number of consecutive planning cycles, the ADV performs a mild brake.

7. The computer-implemented method of claim 6, wherein the mild brake is approximately one m/s^2 and the hard brake is approximately three m/s^2.

8. A non-transitory machine-readable medium having instructions stored therein, which when executed by one or more processors, cause the one or more processors to perform operations, the operations comprising:
   perceiving an environment for an autonomous driving vehicle (ADV), including one or more obstacles;
   determining whether the ADV will potentially collide with the one or more obstacles based on a planned trajectory;
   if the ADV is determined to potentially collide, determining a time to collision based on the planned trajectory and the one or more obstacles;
   if the determined time to collision is less than a threshold or the time to collision decreases for a predetermined number of consecutive planning cycles, generating a warning signal to alert an operator of the ADV; and
   sending the warning signal to a user interface of the ADV to alert the operator of the potential collision.

9. The non-transitory machine-readable medium of claim 8, wherein the warning signal is sent through a controlled area network (CAN) bus to a user interface of the ADV to warn the operator.

10. The non-transitory machine-readable medium of claim 8, wherein the threshold is approximately 2 seconds and the predetermined number of consecutive planning cycles is approximately 5.

11. The non-transitory machine-readable medium of claim 8, wherein the operations further comprise displaying the warning signal on a display device of the ADV or sounding an alarm through a speaker device of the ADV.

12. The non-transitory machine-readable medium of claim 8, wherein if the time to collision is determined to be less than the threshold, the ADV performs a hard brake.

13. The non-transitory machine-readable medium of claim 12, wherein if the time to collision is determined to be more than the threshold but the time to collision decreases for the predetermined number of consecutive planning cycles, the ADV performs a mild brake.

14. The non-transitory machine-readable medium of claim 13, wherein the mild brake is approximately one m/s^2 and the hard brake is approximately three m/s^2.

15. A data processing system, comprising:
   one or more processors; and
   a memory coupled to the one or more processors to store instructions, which when executed by the one or more processors, cause the one or more processors to perform operations, the operations including
      perceiving an environment for an autonomous driving vehicle (ADV), including one or more obstacles;
      determining whether the ADV will potentially collide with the one or more obstacles based on a planned trajectory;
      if the ADV is determined to potentially collide, determining a time to collision based on the planned trajectory and the one or more obstacles;
      if the determined time to collision is less than a threshold or the time to collision decreases for a predetermined number of consecutive planning cycles, generating a warning signal to alert an operator of the ADV; and
      sending the warning signal to a user interface of the ADV to alert the operator of the potential collision.

16. The system of claim 15, wherein the warning signal is sent through a controlled area network (CAN) bus to a user interface of the ADV to warn the operator.

17. The system of claim 15, wherein the threshold is approximately 2 seconds and the predetermined number of consecutive planning cycles is approximately 5.

18. The system of claim 15, wherein the operations further comprise displaying the warning signal on a display device of the ADV or sounding an alarm through a speaker device of the ADV.

19. The system of claim 15, wherein if the time to collision is determined to be less than the threshold, the ADV performs a hard brake.

20. The system of claim 19, wherein if the time to collision is determined to be more than the threshold but the time to collision decreases for the predetermined number of consecutive planning cycles, the ADV performs a mild brake.

21. The system of claim 20, wherein the mild brake is approximately one m/s^2 and the hard brake is approximately three m/s^2.

\* \* \* \* \*